C. G. KOPPITZ.
PROCESS OF AND APPARATUS FOR REGULATING SYNCHRONOUS MOTORS CONTROLLING THE SPEED OF CONVERTER COLLECTOR BRUSHES.
APPLICATION FILED OCT. 10, 1912.

1,184,460.

Patented May 23, 1916.

UNITED STATES PATENT OFFICE.

CARL G. KOPPITZ, OF YOUNGSTOWN, OHIO.

PROCESS OF AND APPARATUS FOR REGULATING SYNCHRONOUS MOTORS CONTROLLING THE SPEED OF CONVERTER COLLECTOR-BRUSHES.

1,184,460.     Specification of Letters Patent.     Patented May 23, 1916.

Application filed October 10, 1912. Serial No. 724,965.

*To all whom it may concern:*

Be it known that I, CARL G. KOPPITZ, a citizen of the United States, residing at Youngstown, in the county of Mahoning and State of Ohio, have invented certain new and useful Improvements in Processes of and Apparatus for Regulating Synchronous Motors Controlling the Speed of Converter Collector-Brushes, of which the following is a specification.

In my application Ser. No. 646,988, filed August 31, 1911, I have described and claimed an apparatus for interconverting polyphase and direct electric currents having a potential of from one or two to several hundred thousand volts, in which polyphase currents traverse a closed winding and unidirectional currents are transferred as arcs between segments connected to successive portions of said windings and brushes revolving in synchronism with the polyphase current. In said application, a direct-current motor controlled or kept in step by a synchronous motor energized by the polyphase current, was illustrated for driving the brushes. Provision was made for shifting the angular position of the brushes simply to change the ratio of the voltages of the impressed and converted currents. According to the present invention the speed of such a synchronous control-motor is regulated and a fixed frequency maintained by changing the phase relation between the E. M. F. impressed on the primary winding of the converter and the counter E. M. F. of the synchronous motor. This may be accomplished by several methods, but a preferred method of maintaining the fixed frequency is by changing the phase relation of voltages impressed on the synchronous motor to the axis of current transfer.

Figure 1:
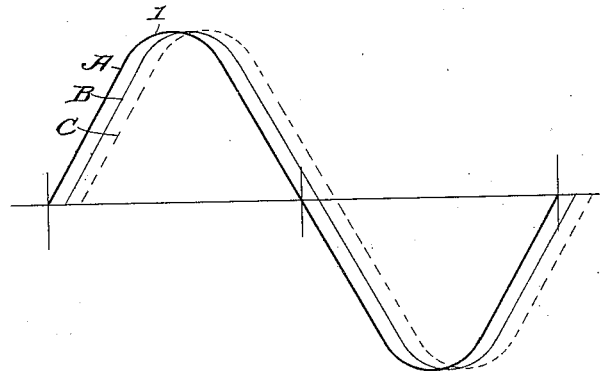
Figure 2:
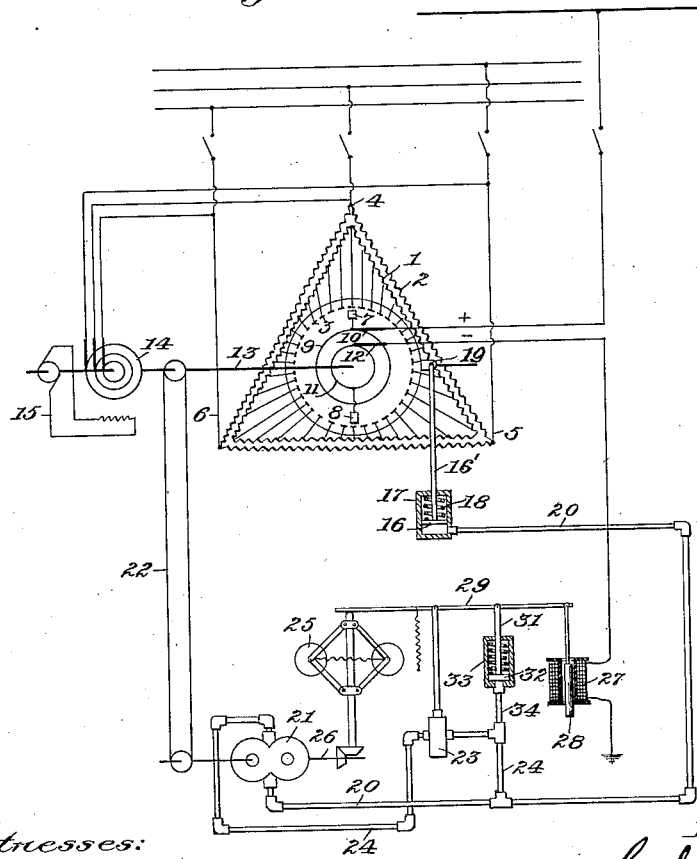

Figure 1 illustrates a group of three alternating-current voltage-waves, successively lagging in position; and Fig. 2 is a diagrammatic view of a converter with a brush-driving shaft the speed of which is controlled by a synchronous motor, provided with means for regulating the speed of this motor and the brushes.

In Fig. 1, the curve A is the E. M. F. induced in winding 2, of Fig. 2, while curves B and C show the counter E. M. F. of the synchronous motor in two different positions with respect to this induced E. M. F. In the operation of this converter three E. M. F.'s are concerned, namely,—that impressed on primary winding 1, due to the rotation of the brushes; second, the secondary E. M. F. induced in the secondary winding 2, of Fig. 2, which may without material error be assumed to be in opposition (or in phase) with that in 1, and which is the E. M. F. impressed on the terminals of the synchronous motor, and third, the counter E. M. F. of the synchronous motor. It is desired to maintain a fixed frequency on the A. C. side when converting from D. C. and to do so by changing the phase relation between the E. M. F.'s represented by curves A and B. In operation, the counter E. M. F. B lags sufficiently behind A to allow the synchronous motor to take sufficient current to maintain its normal speed, and therefore, normal frequency, in overcoming frictional and other loss of the rotating parts, but these losses never remain constant which necessitates an automatic regulating feature. If these losses increase, the phase relation of the above E. M. F.'s may be so shifted as to bring the counter E. M. F. B of the synchronous motor to position C causing the motor to take more power. Conversely, if these losses should decrease, the lag is changed to some position less than that shown at B and the motor takes less power. According to the present invention the angle of lag, or phase relation between A and B is continuously varied to maintain the desired speed and frequency, either by shifting the ring of collector-segments of motor frame, or, as shown, for example, in my copending application No. 646,988, above noted, by interposing an angle shifting device on the shaft between the motor and the brushes, thereby shifting the points of current transfer.

Fig. 2 illustrates a converter of the type shown in my specified application, comprising a closed primary winding 1 and a secondary winding 2. The primary winding is connected by spaced leads to a circular series of collector-segments 3. The secondary winding 2 has three-phase terminals 4, 5, 6. Diametrically-opposite brushes 7, 8, spaced away from the segments, are arranged to rotate in arcing proximity thereto, brush 7 being connected to a slip ring 9 on which bears a fixed positive brush-terminal 10 and brush 8 being connected to a slip ring 11 on which bears a fixed negative brush-terminal 12. These brushes (7 and 8) and rings are carried by a driven shaft 13, coupled to a synchronous motor 14 energized by the three-phase current of the secondary winding and having an exciter 15.

The means for controlling the brush-speed comprises an oil-actuated piston 16 movable in a cylinder 17 against a coiled spring 18. The piston has a rod 16' which is connected to an arm 19 by which the angular position of the ring of collector-segments 3 may be varied. The piston 16 is actuated by oil delivered to cylinder 17 under pressure through a pipe 20, leading from a pump 21 driven through pulleys and a belt 22, from the motor-shaft 13. The pressure of oil in pipe 20 is controlled by a pilot-valve 23 in a bypass 24 leading back from the pressure-pipe 20 to the pump 21. The position of this valve is determined by a centrifugal governor 25, also driven, through the pump shaft 26, by the motor shaft 13. In order to obtain stability in parallel operation, the speed must necessarily decrease with the load, and in order properly to effect this decrease a solenoid 27 in series with the direct-current leads of the machine acts on an iron core 28 pivoted to the lever 29 actuating valve 23, to act independently of the governor in varying the position of this valve. To prevent "hunting" of the converter, the valve-actuating lever 29 may be provided with a movable fulcrum 31, carried by a piston 32 moving vertically in a cylinder 33 against the pressure of a coiled spring, under the pressure of the oil in a branch 34 of the pipe 24.

It is well known that poles are produced in the primary iron of a polyphase induction motor by the polyphase currents flowing in the windings, adjacent thereto, and that these poles rotate in synchronism with the polyphase E. M. F's. impressed on these windings. Although the magnetic circuits linked by the windings 1, 2, Fig. 2, are not strictly the same as that of the induction motor cited, being closed instead of opened by the air gap, rotating poles or field nevertheless exist. The shifting of the points of current-transfer which occurs when the ring of collector segments is shifted, is, therefore, effected in definite relation to the poles of the motor.

While revoluble brushes are employed in the particular converter illustrated, any construction in which the collector-segments, constituting the transfer-terminals of the winding, and the brushes or collectors, constituting the transfer-terminals of the direct-current circuit, are relatively revoluble, is of course operative to effect the synchronous transfer of unidirectional currents between the successive portions of the winding and the collectors.

I claim:

1. In a system for interconverting alternating and direct currents, comprising converter windings adapted to be traversed by alternating currents, a synchronous motor having its alternating current windings connected to the leads of said converter windings, and collectors driven by said motor for transferring unidirectional current to successive portions of said windings, the process of maintaining a fixed frequency which consists in changing the phase relation of voltages impressed on the synchronous motor to the axis of current transfer.

2. In a system for interconverting alternating and direct currents, comprising converter windings adapted to be traversed by alternating currents, a synchronous motor having its alternating current windings connected to the leads of said converter windings, and collectors driven by said motor for transferring unidirectional current to successive portions of said windings, the process of maintaining a fixed frequency which consists in varying the point of current transfer relatively to the axis of the rotor winding of the synchronous motor.

3. An apparatus for interconverting alternating and direct electric currents, comprising a winding, an alternating-current circuit in operative relation to said winding, a group of commutator-segments, spaced leads from said winding to said segments, direct-current brushes adjacent to said segments, and means for relatively moving said segments and brushes in synchronism with the currents in said winding, means for controlling the relative speed of said segments and brushes, comprising a synchronous motor in circuit with said winding, and devices for shifting the angle of current-transfer between said segments and brushes relative to the phase winding.

4. An apparatus for interconverting alternating and direct electric currents, comprising a winding, an alternating-current circuit in operative relation to said winding, a group of commutator-segments, spaced leads from said winding to said segments, direct-current brushes spaced away from said segments, and means for relatively moving said segments and brushes in synchronism with the current in said windings, means for controlling the relative speed of said segments and brushes, comprising a synchronous motor in circuit with said winding, and devices for shifting the angle of current-transfer between said segments and brushes relative to the phase winding.

In testimony whereof I affix my signature in presence of two witnesses.

CARL G. KOPPITZ.

Witnesses:
J. W. BLACKBURN,
B. M. GEE.

Copies of this patent may be obtained for five cents each, by addressing the "Commissioner of Patents, Washington, D. C."